(12) United States Patent
Wang

(10) Patent No.: US 7,675,890 B2
(45) Date of Patent: Mar. 9, 2010

(54) QOS BASED LOAD-BALANCE POLICY FOR WLAN

(75) Inventor: Shiwei Wang, Taipei (TW)

(73) Assignee: Delta Networks, Inc., Taipei (TW)

( * ) Notice: Subject to any disclaimer, the term of this patent is extended or adjusted under 35 U.S.C. 154(b) by 1429 days.

(21) Appl. No.: 10/938,379

(22) Filed: Sep. 10, 2004

(65) Prior Publication Data
US 2005/0053046 A1 Mar. 10, 2005

Related U.S. Application Data

(60) Provisional application No. 60/481,351, filed on Sep. 10, 2003.

(51) Int. Cl.
*H04W 4/00* (2009.01)

(52) U.S. Cl. ............... 370/338; 370/400; 370/412; 370/463; 709/232

(58) Field of Classification Search ............ 370/400, 370/329, 232, 338, 238, 256, 463, 412, 415, 370/417; 713/201; 709/232, 224; 455/411, 455/439; 714/758
See application file for complete search history.

(56) References Cited

U.S. PATENT DOCUMENTS

| | | | | | |
|---|---|---|---|---|---|
| 5,872,773 | A | * | 2/1999 | Katzela et al. | 370/256 |
| 5,978,951 | A | * | 11/1999 | Lawler et al. | 714/758 |
| 6,026,444 | A | * | 2/2000 | Quattromani et al. | 709/232 |
| 6,411,603 | B1 | * | 6/2002 | Ahuja et al. | 370/238 |
| 6,738,363 | B1 | * | 5/2004 | Best et al. | 370/329 |
| 6,950,628 | B1 | * | 9/2005 | Meier et al. | 455/41.2 |
| 6,952,401 | B1 | * | 10/2005 | Kadambi et al. | 370/232 |
| 2002/0022483 | A1 | * | 2/2002 | Thompson et al. | 455/439 |
| 2002/0031142 | A1 | * | 3/2002 | Metin et al. | 370/463 |
| 2002/0035699 | A1 | | 3/2002 | Crosbie | 713/201 |
| 2002/0085719 | A1 | | 7/2002 | Crosbie | 380/248 |
| 2003/0133420 | A1 | | 7/2003 | Haddad | 370/319 |

(Continued)

FOREIGN PATENT DOCUMENTS

| | | |
|---|---|---|
| EP | 1156 623 | 11/2001 |
| WO | WO 01/35585 | 5/2001 |
| WO | WO 02/080613 | 10/2002 |

OTHER PUBLICATIONS

Velayos, H.; Aleo, V.; Karlsson, G., "Load balancing in overlapping wireless LAN cells," Communications, 2004 IEEE International Conference on , vol. 7, no., pp. 3833-3836 vol. 7, Jun. 20-24, 2004.*

(Continued)

*Primary Examiner*—Kwang B Yao
*Assistant Examiner*—Jeffrey M Rutkowski
(74) *Attorney, Agent, or Firm*—J.C. Patents

(57) ABSTRACT

A load balancing method for a wireless local area network (LAN) which has a plurality of access points is provided in the present invention. The load balancing decision is made by a load balancing module according to traffic conditions and bandwidth availability of each traffic priority class based on a corresponding class of service. The load balancing module is a centralized module which the load balancing decision is determined by the centralized module, or is determined through information exchanges among distributed load balancing modules of the access points. The load balancing decision also takes into consideration of VLANs per VLAN tag basis. Each of the VLANs is defined with the corresponding traffic priority class.

67 Claims, 7 Drawing Sheets

U.S. PATENT DOCUMENTS

| | | | |
|---|---|---|---|
| 2004/0023640 A1* | 2/2004 | Ballai | 455/411 |
| 2004/0054774 A1* | 3/2004 | Barber et al. | 709/224 |
| 2004/0068668 A1* | 4/2004 | Lor et al. | 713/201 |
| 2004/0078598 A1* | 4/2004 | Barber et al. | 713/201 |
| 2004/0103193 A1* | 5/2004 | Pandya et al. | 709/224 |
| 2006/0165103 A1* | 7/2006 | Trudeau et al. | 370/412 |
| 2007/0070959 A1* | 3/2007 | Almeroth et al. | 370/338 |
| 2007/0217377 A1* | 9/2007 | Takeuchi | 370/338 |

OTHER PUBLICATIONS

Vanhatupta et al., "Design of a Manageable WLAN Access Point", Springer-Verlag Berlin Heidelberg, 2004, all.*

Aleo, "Load Distribution in IEEE 802.11 Cells", Mar. 2003, KTH, Royal Institute of Technology, pp. 9-11 and 30.*

"Performance Evaluation of a QoS-Aware Handover Mechanism" Steffen Sroka and Holger Karl / Proceeding of the Eighth IEEE International Symposium on Computers and Communication (ISCC '03) / Jul. 3, 2003 / pp. 117-124.

" QoS-Conditionalized Handoff for Mobile IPv6 " Xiaoming Fu and Holger Karl / XP002305064 / year 2002 / p. 1-10 / Retrieved from the Internet: URL: http://citesee_ict_psu_edu/rd/67794591%2C5077245%2C0.25%2CDownload/http%3AqSqqSqwww-tkn.ee.tu-berlin.deqSqpublicationsqSqpapersqSqnetworking2002_final_201.ps>.

"12.2 Elements of Standard" From The Switch Book by author Wiley / XP002305065 / Jun. 1, 2000 / p. 478-480.

* cited by examiner

QOS BASED LOAD-BALANCE POLICY FOR WLAN

CROSS-REFERENCE TO RELATED APPLICATION

This application claims the priority benefits of U.S. provisional application titled "QoS BASED LOAD-BALANCING METHOD FOR WLAN" filed on Sep. 10, 2003, Ser. No. 60/481,351. All disclosure of this application is incorporated herein by reference.

BACKGROUND OF THE INVENTION

1. Field of the Invention

This invention relates to balancing traffic loads and improving throughput in network communication, and more particularly to a QoS (quality of service) based load-balancing scheme for multiple-band access points (APs), wireless local are network (WLAN) switches, switched multiple APs, and clustered AP centralized management or distributed but synchronized management.

2. Description of Related Art

Wireless Local Area Networks (WLAN) have become a popular option to wired LANs, especially at locations where wiring is difficult or costly. Conventional wired LANs are typically geographically limited. Although a single access point ("AP" hereinafter) can support a relatively large group of network stations, it functions only within a finite range of typically several hundred feet. Extended coverage areas can be accomplished by installing multiple access points with overlapping coverage cells, so that network stations can roam throughout the area without ever losing network contact. A typical wireless LAN can use up to hundreds of access points, and thus the cost of the access points can strongly influence the cost of the entire system.

In order to provide transparent connectivity between the computers on the wired LAN and the network stations, an access point processes all packets on its backbone interface. Access points usually lock at the destination address of each data packet, and consult internal tables to determine whether the packet should be received and forwarded out its wireless interface.

Referring to FIG. 1, a schematic overview of a wireless LAN 10 including several access points AP1, AP2 and AP3, each of which has its own coverage areas 20, 30 and 40. Many network stations are present of which 50 and 60 are shown. In this method, the decision of a network station 50 to switch from an access point AP1 to another access point AP2, or AP3 for load balancing is dependent on communication quality of each respective access point and the traffic load of each access point and of the network station itself. The access points AP1, AP2, and AP3 monitor their traffic load preferably, by keeping record of the average TX/RX (transmission/reception) rate activity time value averaged over a certain time interval. On the other hand, when the communication equality decreases below a predetermined level, the network station 50 starts to search for a client 30, 40 (an access point AP2, AP3) with a better communication quality. As known from IBEE 802.11, the other access points AP2, AP3 may be operating on channels with other frequencies than the associated access points AP1. For maintaining better communication quality for the network stations, such as 50 and 60, installing multiple access points to obtain extended coverage areas with overlapping coverage cells is a good solution. However, some specific network station may be covered by several access points. Load balancing over multiple access points (APs) is proposed in the art.

Load balancing over multiple access points (APs) can only be found in a few commercially available wireless local area network (WLAN) switch implementations. In those cases, either the number of connections or the level of utilization is used to benchmark the traffic conditions for deciding whether load-balancing measurement needs to be activated. In all of these cases, traffic is treated as single class and the difference between traffic type and their priority level is not taken into account.

Referring to one conventional scheme of load balancing for wireless LAN, which refers to a European Patent Application EP 156623A1, published on Nov. 21, 2001, titled "Wireless LAN with Load Balancing" proposed by Murray Hill, et al., of Lucent Technologies Inc. In the proposed scheme of load balancing, a communication system with a plurality of access points and at least one network station is provided. For the load balancing purpose, the system selects a communication connection with one of the access points using a predetermined cost function. The predetermined cost function taking the access point traffic load parameters and the network station traffic load parameters into account. In this scheme, a client collects traffic and reception information forming the access points providing radio coverage. The client then uses a cost function to decide the best access point for association. This scheme has three shortcomings. Firstly, all clients underlying hardware and firmware design are manufacturer-dependent. In many cases, finite state machines in hardware are used to handle packet association, which renders this conventional method impractical to implement. Secondly, this conventional scheme adopts reception as the parameter in the cost functions. In prioritized or multimedia traffics with guaranteed quality of service ("QoS", hereinafter), bandwidths available under certain reception level may not necessarily match to the traffic type of the client that looks for an appreciate access point to associate. Third, the assumption of this proposed scheme based on a single subnet for all covering access points. In reality, multiple subnets may be involved in a physical network of access points. The access point advertises a right reception level and traffic conditions may not have be of a right virtual local area network (VLAN). For example, a client wants to associate with the VLAN for a financial department, but that VLAN's corresponding SSID (Service Set Identifier) is not available in the access point that gives the optimal result in cost function.

Another conventional load balancing is provided in U.S. Pat. No. 5,987,062, issued on Nov. 16, 1999, titled "Seamless Roaming For Wireless Local Area Networks" by Darwin A. Engwer, et at of Netwave Technologies, Inc. In the proposed architecture, a wireless LAN allows roaming of a network station to allow it to serially associate with a number of access points of the network fixed backbone. This roaming is supported by an improved measurement of communications link quality, which includes calculating a mean error free length of a test pattern, which is a digital data message, broadcast by each access point and received by a network station. Thus an accurate measurement of link quality is provided which allows the network station to determine whether it should change its association to another access point having improved communications link quality. Further, a load balancing process is provided to balance the communications load amongst a variety of access points, by allowing network stations also to switch their association with access points in accordance with a current total data rate at any given access point and also considering the number of currently high data rate network stations associated with a particular access point at any one time. This scheme has some shortcomings. One of them is that all clients underlying hardware and firmware design are manufacturer-dependent. Each network station within range should have the function to receive the test pattern broadcast by each access point and compare it to an identical test pattern previously stored in the network station. In addition, a beacon searching process, which is supported by a separate process called scanning, accomplishes the load balancing process proposed in the architecture. The purpose of scanning is to supply the information to keep current each network station's AP list. In scanning, the network station periodically tunes to the various hop frequencies and listens for a short beacon from any AP. This tuning is out of the hop sequence of the AP with which that MU is currently registered. Upon receipt of a short Beacon, the network station enters the short beacon data in its AP list. In the architecture, roaming is supported by software (e.g. firmware) which is a set of computer programs partially located in each AP and partially located in each network station, which cause poor compatibility for the network station.

Yet another conventional method in prior art is proposed in an International Patent Application WO 01/43467, published on Jun. 14, 2001, titled "Flexible Wireless LAN Architecture Based On A Communication Server" by Juan Grau, et al. of Proxim, Inc. In the architecture, a wireless LAN system includes a wireless communication server and one or more access points operably connected to the wireless communication server. The access points are adapted to wirelessly transmit and receive data to and from remote network stations using radio frequency communications such that the remote network stations form part of a wireless LAN. The wireless communication server is physically separate from the access points. The wireless communication server maintains centralized filtering and forwarding of data to be transmitted to the remote units. In the architecture, a method of directing data to a remote network station in a wireless LAN is also proposed. In the wireless communication server, network data is analyzed to determine, from the remote network station identification, a desired access point to transmit the data. The wireless communication server is adapted to select the desired access point from a number of possible access points. In the wireless communication server, the data is redirected to the correct access point. In an access point, data is wirelessly transmitted to the remote network station using a radio frequency communication link. The load balancing method is proposed by using a centralized load-balancing communication server to manage a set of access points. However, this work does not go into specifics of the load-balancing policies and the nature of the traffic types.

SUMMARY OF THE INVENTION

Therefore, one object of this present invention is to provide a load-balancing method for wireless local area network (LAN), in which a load-balancing decision is performed at the access point (AP) site, either by a centralized module or through information exchanges among distributed load-balancing modules. This is manufacturer-independent and avoids the implementation changes in the client side.

Another object of this present invention is to provide a load-balancing method for wireless local area network (LAN), in which takes into account of quality of service ("QoS", hereinafter) and is capable of balancing loads according to traffic conditions and bandwidth availability of each priority class.

A further object of this present invention is to provide a load-balancing method for wireless local area network (LAN), in which takes multiple VLANs into account. Load balancing is carried out per VLAN tag basis.

Yet another object of this present invention is to generalize a method for centralized server as well as distributed load-balance modules.

To achieve these and other advantages and in accordance with the purpose of the invention, as embodied and broadly described herein, the invention provides a load balancing method for a wireless local area network (LAN) having a plurality of access points, wherein the load balancing decision being made by a load balancing module according to traffic conditions and bandwidth availability of each traffic priority class based on a corresponding class of service.

In an embodiment of the above load balancing method, the load balancing module is a centralized module which the load balancing decision is determined by the centralized module.

In an embodiment of the above load balancing method, the load balancing decision is determined through information exchanges among distributed load balancing modules of the access points.

In an embodiment of the above load balancing method, the load balancing decision being made also by taking into consideration of a plurality of virtual local area networks (VLANs) per VLAN tag basis. In an embodiment, each of the VLANs is defined with the corresponding traffic priority class.

In an embodiment of the above load balancing method, when the corresponding traffic priority class of the VLAN tag is mapped to a constant-bit-rate traffic type, the load balancing decision being made by the load balancing module of one of the access point comprising reserving and dividing a bandwidth for each of the access points in according to a bit rate to get a number of concurrent connections that are accommodated under reservation; and a new constant-bit-rate request being admitted if and only if a quantum of bandwidth equals to the bit-rate is available, and the quantum of bandwidth is assigned to a requesting session.

In an embodiment of the above load balancing method, each of the access points having a plurality of queues. Each of the queues being associated with an service set identifier (SSID) or a basic service set identifier (BSSID), the SSID or BSSID mapping to a VLAN tag corresponding to one of the VLANs. In an embodiment, the relationship between SSID or BSSID and VLAN tag is one-to-one or many-to-one.

In an embodiment of the above load balancing method, when the corresponding traffic priority class of the VLAN tag is mapped to a variable-bit-rate traffic type, the load balancing decision being made by the load balancing module of one of the access point comprising using a tuple of a congestion level indicator (CLI) to indicate if congestion occurs.

In an embodiment of the above load balancing method, the load balancing decision being made by the load balancing module further comprises revoking reverse roaming to force de-association and re-association of traffics to achieve more optimized traffic distribution.

In an embodiment of the above load balancing method, the tuple has a plurality of attributes to indicate if the congestion occurs. The attributes of the tuple are, for example, a queue length, utilization level or the number of concurrent sessions or any other attributes which can indicate the traffics in the access points. In an embodiment, each of the attributes is associated with a set of high and low water marks. The load balancing decision is made in according to one of the attributes of the tuple independently.

In an embodiment of the above load balancing method, the load balancing decision is made by a policy-based trigger, which is defined based on a logic expression of the attributes of the tuple. For example, the logic expression can be any combination of AND/OR relationships of the attributes of the tuple, or equivalence which is expressed by the AND/OR relationships of the attributes. In a embodiment, each of the attributes is associated with a set of high and low water marks and the policy-based trigger is defined based on another logic expression of a portion or all of the high and/or low water marks. For example, the logic expression can be any combination of AND/OR relationships of the high and/or low water marks of the attributes of the tuple, or equivalence which is expressed by the AND/OR relationships of the high and/or low water marks of the attributes. In an embodiment, the policy-based trigger is activated when one or more of the attributes of the tuple reaches the high water mark, or the policy-based trigger is activated when a portion or all of the attributes of the tuple drop to the low water mark, or any other condition designed as required for activating the policy-based trigger. In one embodiment, the policy-based trigger is selected from a set of default policies which are predefined in the load balancing module and selected by a network administrator.

In an embodiment of the above load balancing method, each of the high water marks and the low water marks of the attributes of the tuple is assigned its corresponding weight, the policy-based trigger is defined further based one the first logic expression of a portion or all of the weights of the high water marks and the low water marks. The weights of the high water marks and the low water marks of the attributes of the tuple are determined based on a cost function. In one embodiment, the cost function is a binary decision, which depends on the relationship of the value of the attribute and the high water mark or the low water mark. In another embodiment, the result of the cost function is a quantification decision, which depends on the differences between the value of the attribute and the high water mark in one or more of the attributes of the tuple. In another embodiment, the result of the cost function is a quantification decision, which depends on the differences between the value of the attribute and the low water mark in one or more of the attributes of the tuple.

In an embodiment of the above load balancing method, the trigger is activated for onset of congestion, the load balance module examines the tupes of the CLIs in all of the overlapping access points with priority levels of the traffic priority classes higher than or equal to the overloaded traffic stream and selects the SSIDs with CLIs according to conditions set by the trigger as targets for shifting the load over.

In an embodiment, the trigger is activated for onset of congestion, the load balance module examines the tuples of the CLIs in all of the overlapping access points with priority levels of the traffic priority classes higher than or equal to the overloaded traffic stream and selects traffic sessions corresponding to the BSSIDs with CLIs based on conditions set by the trigger as targets for shifting the load over.

In an embodiment of the above load balancing method, when the CLI of one of the SSIDs or BSSIDs in the same VLAN drops below the low watermark, the load balance module moves over the traffics from other SSIDs or BSSIDs in the same VLAN in all of the overlapping access points until the CLIs of the SSIDs or BSSIDs in the same VLAN become roughly the same. In an embodiment, the step of moving over the traffic sessions by the load balance module comprises moving the load of the SSIDs or BSSIDs above the low water mark to the SSIDs or BSSIDs with CLIs lower than the low water mark until the CLIs of the SSIDs or BSSIDs in the same VLAN become equal.

In an embodiment of the above load balancing method, to balance the traffic loads, the sessions in sleep modes are selected first for load balancing. To balance the traffic loads, for example, reverse roaming is applied to activate the variable-bit-rate traffics.

In an embodiment of the above load balancing method, the policy used for the load balancing takes into accounts the reception of various clients and identifies the transformation that gives the most optimal results in performance improvements. The policy used for the load balancing is independent from the choice of a service policy. For example, the service policy is First-Come, First-Served (FCFS), a strict priority, or a weighted fair-queuing.

To achieve these and other advantages and in accordance with the purpose of the invention, as embodied and broadly described herein, the invention provides a scheme for load balancing in a wireless local area network (LAN). The LAN has a plurality of access points. Each of the access point in the scheme comprises a Hostapd program. The Hostapd program has a tuple of a congestion level indicator. The tuple has a plurality of attributes. The Hostapd program executes load balancing by triggering a policy based on the attributes in the tuple of the congestion level indicator.

In the scheme for load balancing in a wireless local area network (LAN), the Hostapd program comprises a load balance module for receiving a queue statistic information. The congestion level indicator is updated with a queue length information from the queue statistic information.

In the scheme for load balancing in a wireless local area network (LAN), the Hostapd program comprises a bandwidth monitor module, for sampling statistical information of a bandwidth, wherein the congestion level indicator is updated with utilization information from the bandwidth monitor module.

In the scheme for load balancing in a wireless local area network (LAN), the congestion level indicator is transmitted to a wireless driver and sets the wireless driver for executing actions based on the updated congestion level indicator.

In the scheme for load balancing in a wireless local area network (LAN), the Hostapd program is configured by a configuration system program. In an embodiment, the Hostapd program is configured by a Hostapd.conf file stored in the configuration system program, which is created by the configuration system program.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

Figure 1:
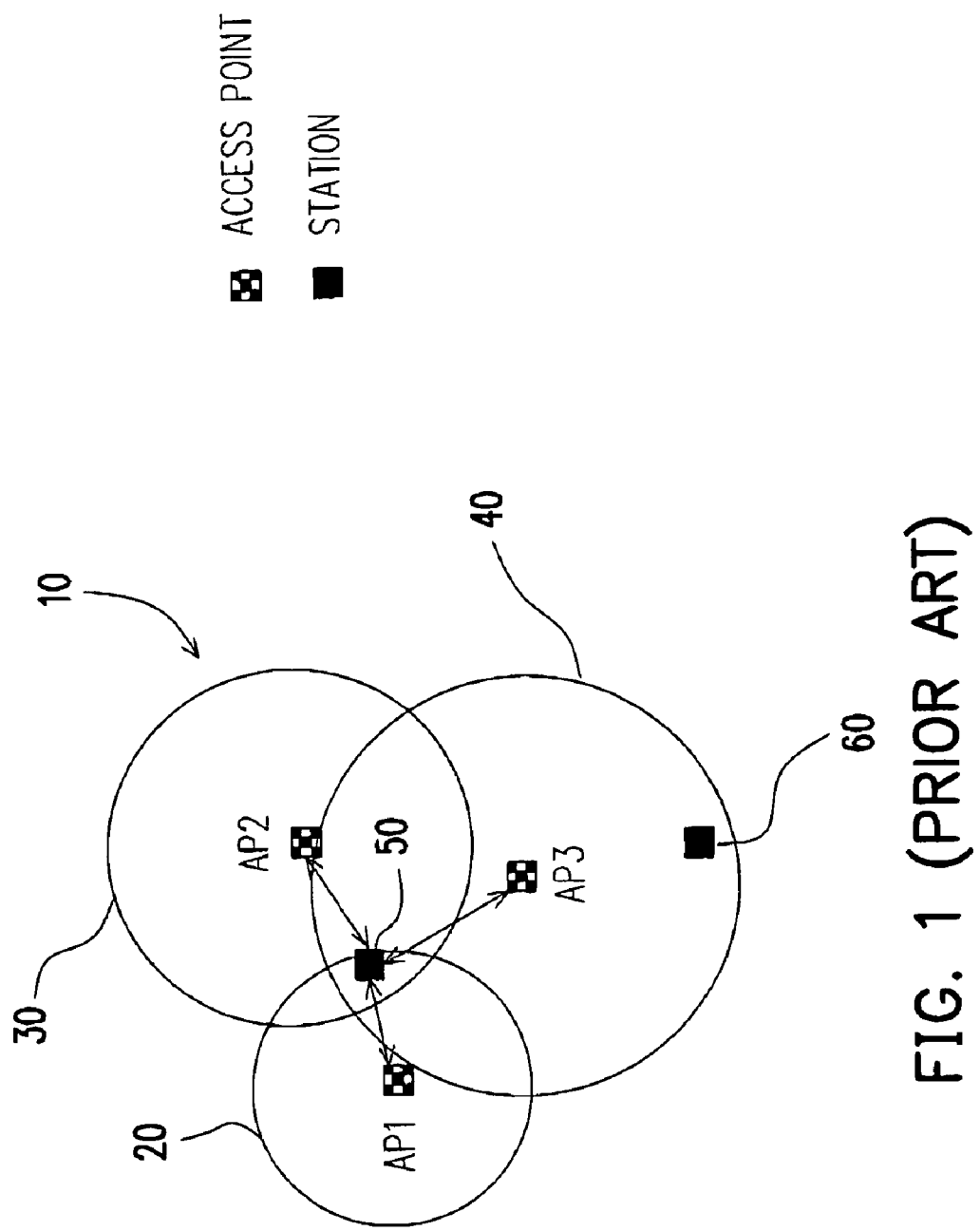
FIG. 1 is a schematic overview of a wireless LAN including a plurality of access points and a network station according to one conventional scheme in prior art.

Before describing the preferred embodiments of load-balancing method for this present invention, several terms are defined as follows:

Definition 1:

Reverse Roaming: A radio port disconnects a session during congestion period and the client is forced to re-associate with another radio port covering the same spatial region without interruption to service at high level.

Definition 2:

Constant-bit rate traffic: Traffics that need to be transmitted in a constant bandwidth in a time interval (for example voice and video).

Variable-bit rate traffic: Traffics that can be transmitted in a variable bandwidth over in a time interval.

Definition 3:

Congestion Level Indicator (CLI): a tuple of attributes used to indicate a level of congestion per SSID (Service Set IDentifier). A set of high and low watermarks associate with each attribute is stored in a Congestion Level Indicator. The number and types of attributes in the Congestion Level Indicator are of discretion of each implementation and will not affect the validity of our proposed concept.

Definition 4:

High/low watermarks: high water markers serve as warnings for overload. Low water marks serve to indicate that underload may happen.

Definition 5:

Overlapping coverage: This refers to multiple antenna coverage, from either directional or omni-directional antenna, of non-overlapping channels.

In the present invention, a load-balancing scheme and method for wireless local area network (LAN) are proposed. In the proposed load-balancing scheme and method, a load-balancing decision is performed at the access point (AP) site. The load-balancing decision determined by the AP site is dependent on, for example, a centralized module. In an alternative embodiment, the load-balancing decision determined by the AP site is dependent on information exchanging among distributed load-balancing modules, installed in the AP sites. The proposed load-balancing scheme and method is manufacturer-independent and avoids the implementation changes in the client side.

The proposed load-balancing scheme and method take into account of quality of service (QoS) and is capable of balancing loads according to traffic conditions and bandwidth availability of each priority class, which depends on the corresponding class of service. Furthermore, the proposed load-balancing scheme and method take multiple virtual local area networks (VLANs) into account. Load balancing is carried out per VLAN tag basis.

A conventional QoS load balancing over multiple access points (APs) can only be found in a few commercially available wireless local area network (WLAN) switch implementations. In those cases, either the number of connections or the level of utilization is used to benchmark the traffic conditions for deciding whether load-balancing measurement needs to be activated. In all of these cases, traffic is treated as single class and the difference between traffic type and their priority level are not taken into account.

As known in the art, the traffic priority level is determined by either the nature of the traffic, being constant-bit rate or not, and billing policies. A QoS (quality of service)-based load-balancing scheme purposed in the present invention takes a traffic priority class and a traffic type into account. In the proposed scheme, bandwidth reservation is offered in a high priority or constant-bit rate traffic is offered while exercise load-balancing in low priority traffic. If all traffics are treated as one single type, service contract cannot be assured.

Also, jitters would occur in constant bit traffic streams and cause recognizable service quality problem to users. The proposed scheme is compatible to the existing IEEE 802.1Q standard and the evolving 802.1e standard. In addition, utilization itself cannot be a good benchmark of availability in wireless LAN. Interference and reception level due to spatial locality often play critical roles as well. An AP with low utilization but poor reception for a client may play critical roles as well. An AP with low utilization but poor reception for a client may have worse bandwidth availability to an AP with high utilization but very good reception. Therefore, a load balancing method at least in association with the traffic type and traffic priority level thereof is provided in this present invention and is described as follows.

At each radio port in AP, multiple queues are kept. Each queue is associated with at least one traffic priority level. Each of the queues is served with at least one service contract. High priority traffic for constant-bit rate traffic is served with reserved bandwidths. The queues defined in the AP can be determined according to the applications of the AP. For example, as defined in IEEE 802.11(e), four queues in the AP are assigned eight classes of service. Each of the class of service is mapping to one or more virtual local area networks (VLANs). One or more service set identifiers (SSIDs) are mapping to a VLAN tag corresponding to one of the VLANs. The relationship between SSID and VLAN tag is one-to-one, or many to one. The load balancing module performs load balancing in according to the corresponding traffic priority class within the same VLAN and one or more SSIDs. In an alternative embodiment, one or more BSSIDs (Basic Service Set Identifiers) are mapping to a VLAN tag corresponding to one of the VLANs.

The service contract specifies the bandwidth dedicated to each subnet (designated by VLAN tag). This of course translates to the assignment of bandwidth available to serve the corresponding queue. The relationship between BSSID and VLAN tag can be either one-to-one or many-to-one, but not one-to-many or many-to-many. That is, one or multiple SSIDs or BSSIDs are mapped to a VLAN tag, but one SSID or one BSSID cannot be mapped to multiple VLAN tags. This implies only one traffic priority type can be defined for each VLAN subnet.

Constant-Bit-Rate Traffic Case

The bandwidths for constant-bit-rate traffic types are reserved. The reserved bandwidth is divided by the bit-rate for each connection to get a maximum number of concurrent connections that can be accommodated under reservation. When the number of constant-bit rate sessions reaches the maximum number of reserved sessions, a new constant-bit rate request is admitted if and only if a quantum of bandwidth is then assigned to the requesting session. This new session will be treated in the same way as assigned to the requesting session. This new session will be treated in the same way as other reserved sessions of the same priority level.

Varialbe-Bit-Rate Traffic Case

For a variable-bit-rate traffic case, a tuple, named Congestion Level Indicator ("CLI", hereinafter), is used to indicate if congestion occurs. As aforementioned in definitions, the attributes of the tuple is used to indicate the level of congestion per SSID. A set of high and low watermarks associate with each attribute is stored in a CLI. The number and types of attributes in the CLI are of discretion of each implementation. In an embodiment, possible parameters in the CLI are a queue length, a utilization level, and the number of concurrent sessions. In another embodiment, the reception of various clients can also be included in the parameters, for identifying the transformation that can give the most optimal results in performance improvements. The reception of the clients includes a link quality for each of the clients or a signal noise ratio (S/N ratio), and etc. A set of high and low water marks is associated with each the attributes.

The method in this present invention is independent of the exact attributes of the CLIs. Also, policy-based triggers can be defined based on a logic expression of the high and/or low water mark status of attributes in the tuple of the CLI. The logic expression can be, for example, any combination AND/OR relationships of high and/or low water marks of attributes in a tuple of the CLI, or equivalence which could be expressed by the AND/OR relationships of high and/or low water marks of attributes or example, for a CLI including the queue length and the utilization level, a trigger can be activated when either one or both of the two parameters reaches the high water mark. On the other hand, another trigger can be set to activate when both or either of the queue length and the utilization level drop to the low water mark. These triggers are rule-based and set by network administrators.

In one embodiment of the load balancing method of this present invention, each of the high water marks and the low water marks of the attributes of the tuple can be assigned its corresponding weight. The policy-based trigger is defined further based a logic expression, which can be expressed by any combination AND/OR relationships of a portion or all of the weights of the high water marks and the low water marks, or equivalence which could be expressed by the AND/OR relationships of the portion or all of the weights of the high and/or low water marks of attributes.

In a preferred embodiment, the weights of the high water marks and the low water marks are adaptive, which depends on the traffic conditions between the APs or other conditions defined by the network administrators. That is, the weights of the high water marks and the low water marks are customer-defined in considering the traffic conditions. In some application, if the specific weight is much important than others in some class of service, the desired weight will be considered to be adaptive according to the traffic conditions. The policy-based trigger is determined based on a cost function.

The cost function can be determined by requirements of the classes of service applied between the APs. For example, the result of the cost function can be a binary decision or a quantification decision. The binary decision can be, for example, that when the value of the attribute is higher than the high water mark, the weight is multiplied with "1." When the value of the attribute is lower than the high water mark, the weight is multiplied with "0", which means that the weight is not considered. The load balancing method can be performed according to the cost function, which is determined by the values of existed weights of the attributes of the tuple.

The quantification decision can be, for example, determined in according to the differences between the value of the attribute and the high water mark in one or more of the attributes of the tuple. For example, if there are n attributes in the tuple, which are $A_1, A_2, A_3, \ldots A_n$, and their corresponding weights are $W_1, W_2, W_3, \ldots, W_n$. The attributes $A_1, A_3, A_5$ and $A_n$ are, for example, selected for the load balancing decision. In the attributes $A_1, A_3, A_5$ and $A_n$, the differences between the value of the attributes $A_1, A_3, A_5$ and $A_n$ and their respective high water mark are $D_1, D_3, D_5$ and $D_n$. The normalization values in the respective attributes $A_1, A_3, A_5$ and $A_n$ are $N_1, N_3, N_5$ and $N_n$. The method to calculate the normalization values can be achieved by a percentage value obtained by comparing the difference "D" with the value of high water mark. In another embodiment, the method to calculate the normalization values can be achieved by a percentage value obtained by comparing the difference "D" with the value determined by the network administrators. The value set by the network administrators can be, for example, the average value of the values of the attributes $A_1, A_2, A_3 \ldots$ and $A_n$.

Then the result of the cost function can be determined in according to the value $W_1 \times (D_1/N_1) + W_3 \times (D_3/N_3) + W_5 \times (D_5/N_5) + W_n \times (D_n/N_n)$. As described above, the logic expression can be any combination of AND/OR relationships of high and/or low water marks, or equivalence which could be expressed by the AND/OR relationships of the high and/or low water marks. Therefore, the result of the cost function can also be determined in according to any combination of AND/OR relationships of the values $W_1 \times (D_1/N_1)$, $W_3 \times (D_3/N_3)$, $W_5 \times (D_5/N_5)$ and $W_n \times (D_n/N_n)$, as required, or equivalence which could be expressed by the AND/OR relationships of the value $W_1 \times (D_1/N_1)$, $W_3 \times (D_3/N_3)$, $W_5 \times (D_5/N_5)$ and $W_n \times (D_n/N_n)$. In one embodiment of the load balancing method of this present invention, the results of the cost functions can be selected in according to an optimal condition set up by the network administrators, for example, the largest result of the cost functions or the lowest result of the cost functions.

The quantification decision can also be, for example, determined in according to the differences between the value of the attribute and the low water marks in one or more of the attributes of the tuple. For example, if there are n attributes in the tuple, which are $A_1, A_2, A_3, \ldots A_n$, and their corresponding weights are $W_1, W_2, W_3, \ldots, W_n$. The attributes $A_1, A_3, A_5$ and $A_n$ are, for example, selected for the load balancing decision. In the attributes $A_1, A_3, A_5$ and $A_n$ the differences between the value of the attributes $A_1, A_3, A_5$ and $A_n$ and their respective low water mark are $d_1, d_3, d_5$ and $d_n$. The normalization values in the respective attributes $A_1, A_3, A_5$ and $A_n$ are $N_1, N_3, N_5$ and $N_n$. The method to calculate the normalization values can be achieved by a percentage value obtained by comparing the difference "d" with the value of low water mark. In another embodiment, the method to calculate the normalization values can be achieved by a percentage value obtained by comparing the difference "d" with the value determined by the network administrators. Then the result of the cost function can be obtained in according to the value $W_1 \times (d_1/N_1) + W_3 \times (d_3/N_3) + W_5 \times (d_5/N_5) + W_n \times (d_n/N_n)$.

As described above, the logic expression can be any combination of AND/OR relationships of high and/or low water marks, or equivalence which could be expressed by the AND/OR relationships of the high and/or low water marks. Therefore, the result of the cost function can also be determined in according to any combination or equivalents of AND/OR relationships of the values $W_1 \times (d_1/N_1)$, $W_3 \times (d_3/N_3)$, $W_5 \times (d_5/N_5)$ and $W_n \times (d_n/N_n)$, as required, or equivalence which could be expressed by the AND/OR relationships of the values $W_1 \times (d_1/N_1)$, $W_3 \times (d_3/N_3)$, $W_5 \times (d_5/N_5)$ and $W_n \times (d_n/N_n)$.

Equipment manufactures may define a set of default rules to facilitate ease of use by administrators. Load-balance module invokes reverse roaming to force de-association and re-association of traffics and to achieve more optimized traffic distribution. No reverse roaming is allowed for the reservation-based constant-bit-rate traffics. Reverse roaming is used only for variable-bit-rate traffics.

Activated by the triggers for onset of congestion, the load-balance module examines the tuples in the CLIs of the variable-bit-rate traffics in all overlapping access points with a priority level higher than or equal to the overloaded traffic stream. The SSIDs with CLIs below the high water mark are selected as target for shifting the load over from the SSIDs with CLIs above the high water mark. The target SSIDs can be one or more; however, they need to be mapped to the same VLAN subnet as the congested traffic. In an alternative embodiment, the load is evenly moved across all available SSIDs with overlapping radio coverage. However, it is not limited to the even redistribution, in another embodiment, the load can be moved across all available SSID by a user definition, that is, of the user's discretion.

After the redistribution, the CLI of the source and all available targets become roughly the same, in the even redistribution case. On the other hand, once the CLI for a SSID drops below the low watermark, the load-balance module will move over the traffics from other radio ports (with SSID in the same subnet) with overlapping coverage to this port until the target and sources CLI become equal. That is, load of SSID above the low water mark is moved to a SSID with CLI lower than the low water mark until the CLIs become equal. If in the not even redistribution case, in an embodiment, the reception level can be taken into account. The access point with a good reception is in a better condition for receiving more concurrent sessions than others in a poor reception. For example, the parameter of the utilization level in the CLI can be used to indicate the reception level.

To balance the traffic loads, the sessions in sleep modes are selected first. If not enough reverse roaming being applied to activate variable-bit-rate traffics, the selection rule for candidates to balance the load can be designed independently of the proposed scheme. The selection rule should consider the reception of various clients and identify the transformation that can give the most optimal results in performance improvements. In addition, the proposed scheme is also independent from the choice of the service policy. The service policy is, for example, First-Come, First-Served (FCFS), a strict priority, weighted fair-queuing, etc.

Figure 2:
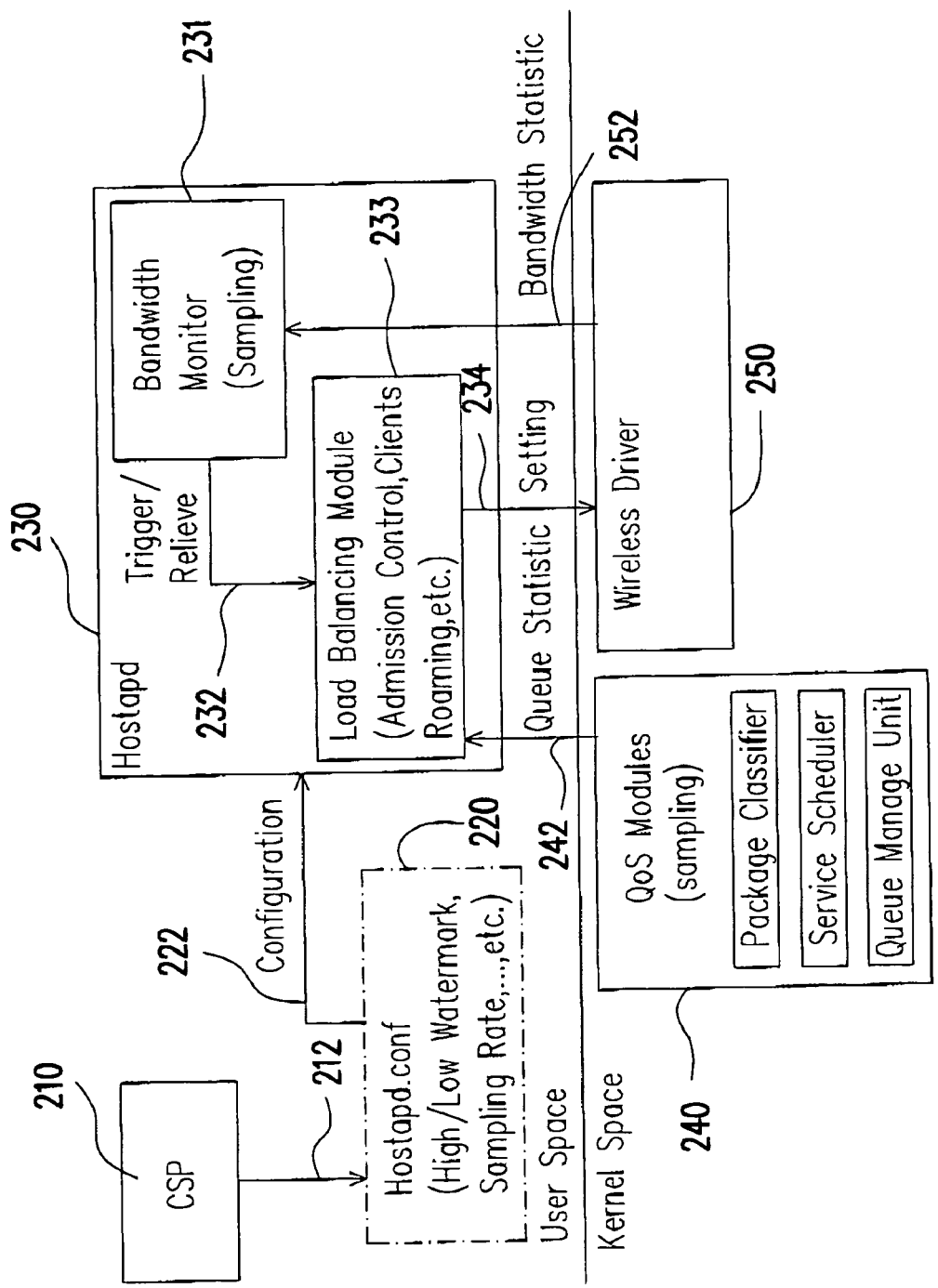
FIG. 2 is a block diagram illustrating a QoS-based load-balancing scheme according to one preferred embodiment of the present invention.

Referring to FIG. 2, a block diagram of a QoS-based load-balancing scheme according to one preferred embodiment of the present invention is depicted herein. In the QoS-based load-balancing scheme, a QoS module 240, including a packet classifier, a service scheduler, and a queue manager unit, resides in a kernel space. The QoS module 240 passes a queue statistic information 242 to a load-balancing module 233, part of a Hostapd Program 230 in a user space, residing in the user space. A bandwidth monitor module 231, also part of the Hostapd program 230 in the user space, samples a bandwidth statistical information 252 and passes an utilization information 232 to the load-balancing module 233. A congestion level indicator (CLI) is updated with a queue length information from the QoS module 240 and the utilization information 232 from the bandwidth monitor 231. Appropriate actions are decided and taken in according to the congestion level indicator (CLI) and some settings 234 are transmitted to a wireless driver 250. The wireless driver 250 executes these actions in according to these settings 234.

Via a customer setting program (CSP) 210 which is configured by an user, some administrator set parameters can be determined and created by the user through signals 212. The user can execute the customer setting program 210 to set these administrator set parameters stored in a "Hostapd.conf" file 220, which is stored in the user space, as shown in FIG. 2. These administrator set parameters, such as high/low watermarks, a reserved bandwidth, a sampling rate, etc. can be set by, for example, a graphics user interface (GUI) in a configuration system program and the Hostapd.conf file 220. These configurations 222 are then sent to the Hostapd Program 230.

Figure 3:
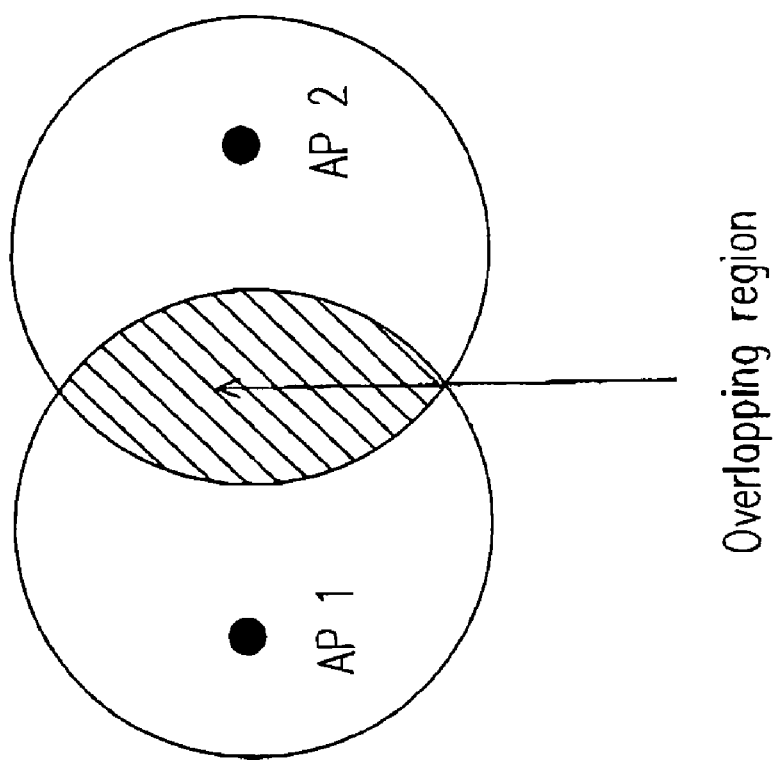
FIG. 3 is a schematic diagram illustrating an overlapping region of access points according to one preferred embodiment of the present invention.
Figure 4:
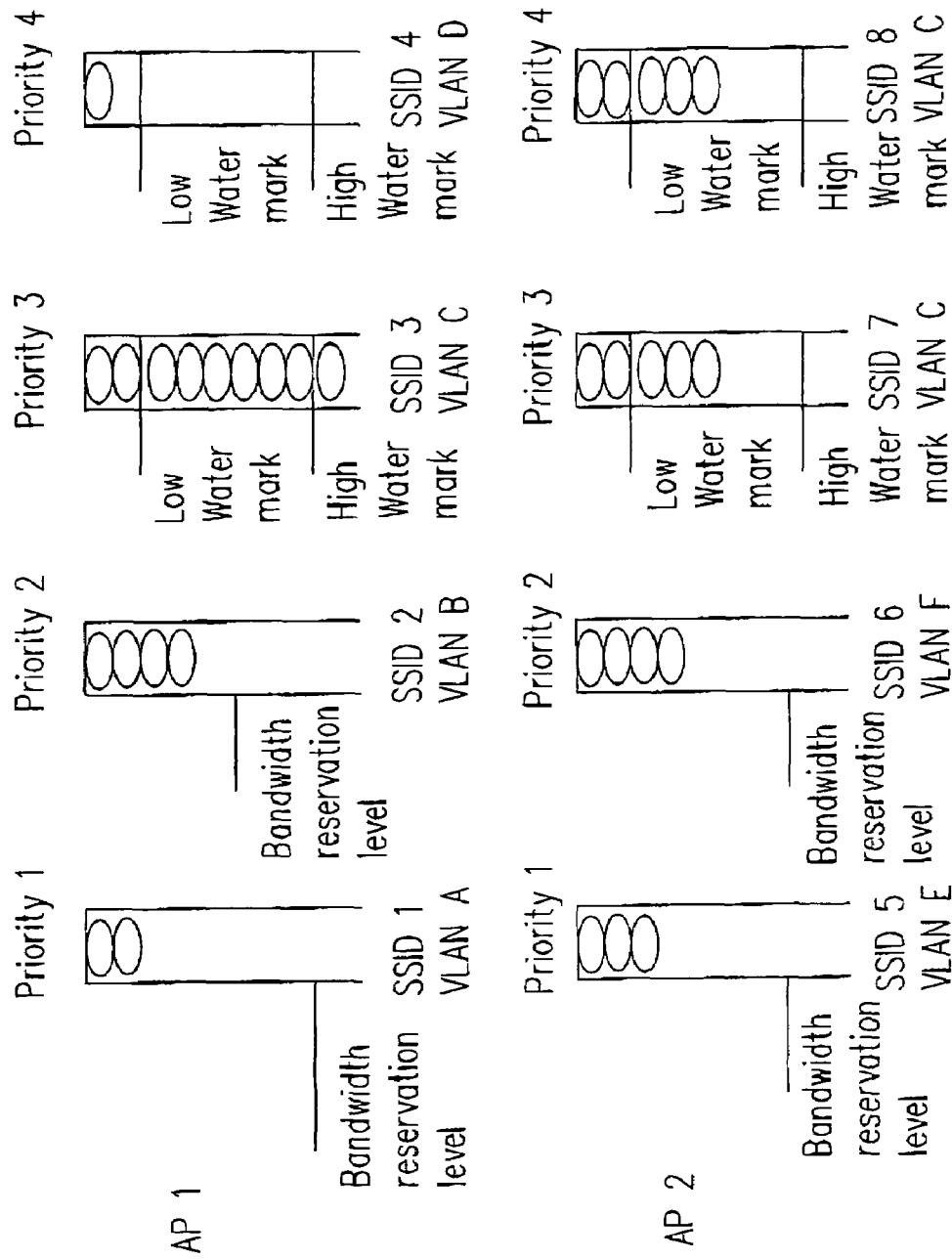
FIG. 4 to 7 are schematic diagrams illustrating congestion level indicator (CLI) based on attributes for priority according to preferred embodiments of the present invention.

Referring to FIG. 3, a load-balancing scheme according to one preferred embodiment of this present invention is illustrated therein. A first access point AP1 and a second access point AP2 spatial coverage overlap in the figure. Whereas FIGS. 3 to 6 depicted snap-shots of evolution in traffic condition before and after applying load-balancing actions proposed by the preferred embodiment. The quantum of a traffic load is represented by circular tokens in the queues. The quantum of traffic takes on an abstract identity without specifying the parameter types. Examples of such quantum of traffic may be packets in service queue, number of session, bits of bandwidth in use, etc., so long as they can be quantified by attributes in CLIs. For example, packets in queue can be quantified by packet length in a CLI.

AP1 and AP2 each have four queues. Shown in FIG. 4 in AP1, the four queues associate with SSIDs 1, 2, 3, and 4 where SSIDs 1 and 2 associate with video and voice traffics. Here, SSIDs 1 and 2 have higher priority than SSIDs 3 and 4, Also, these four SSIDs are mapped to VLAN tags A, B, C, and D. On the other hand, in AP2, the four queues associate with SSIDs 5, 6, 7, and 8. Here, SSID 5, 6 have higher priority than SSIDs 7 and 8. SSIDs 5 and 6 are mapped to VLAN tags E and F. SSIDs 7 and 8 are mapped to a VLAN tag C. Notice that SSIDs 3, 7, and 8 are mapped to the same VLAN (VLAN C). Load-balancing can be allowed to take place.

Figure 5:
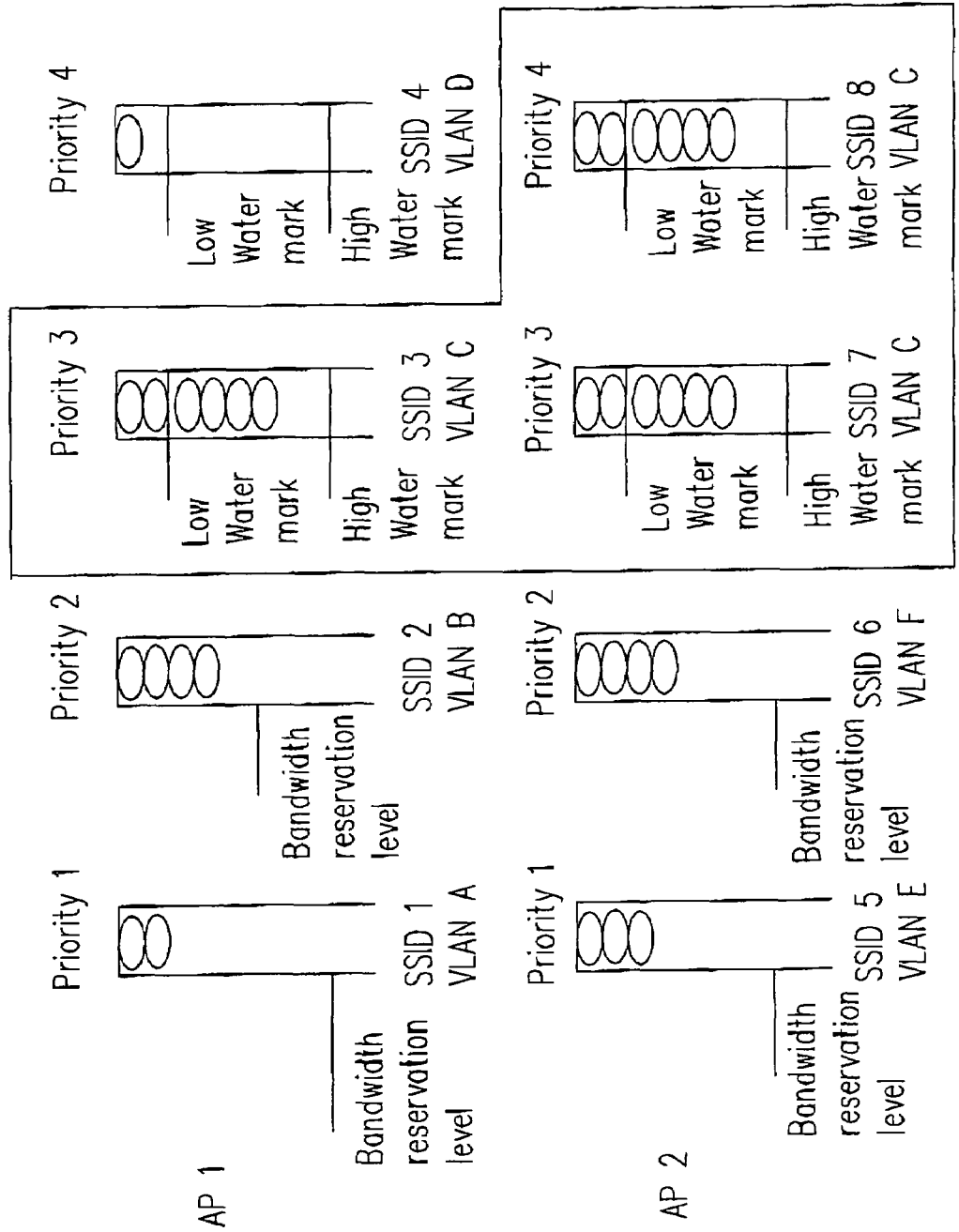

Referring to FIG. 5, one preferred embodiment of this present invention is depicted, where the traffic in SSID 3 has a Congestion Level Indicator (CLI) higher than a high water mark of both the utilization level and the queue length. The load-balancing module then check the Congestion Level Indicators (CLI) of SSIDs 7 and 8 to determine if a congested load from SSID 3 can be shifted over. Here, the Congestion Level Indicator (CLI) for SSIDs 7 and 8 are both lower than a high water mark. Since the CLI of SSID 8 is lower than CLI of SSID 7, the load from SSID 3 is shifted to SSID 8 first until the CLI of the SSID 8 reaches that of SSID 7. After that, the rest of SSID 3's overload traffic is evenly shifted to SSIDs 7 and 8 until the CLIs of all three SSIDs 3, 7 and 8 become the same.

Figure 6:
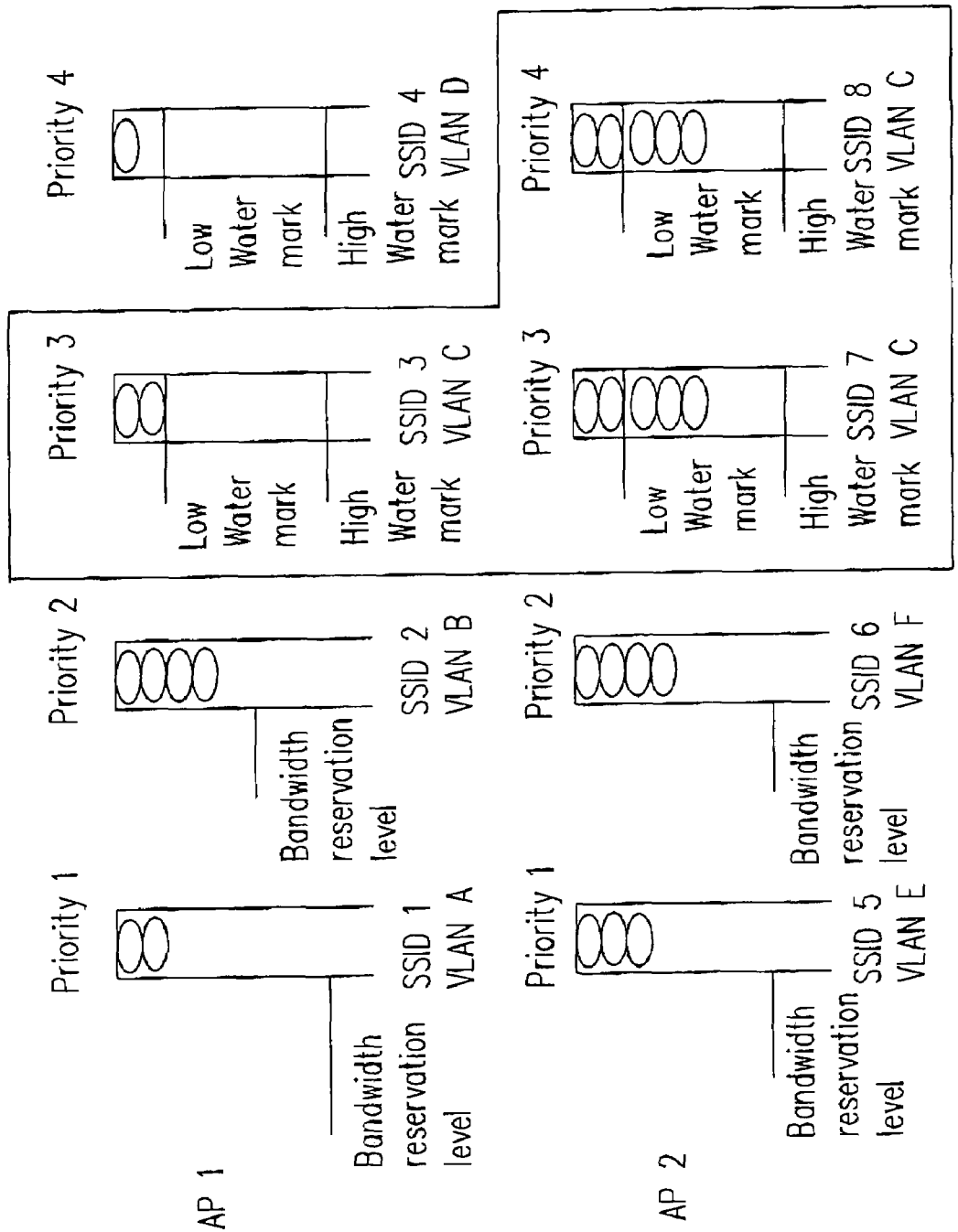
Figure 7:
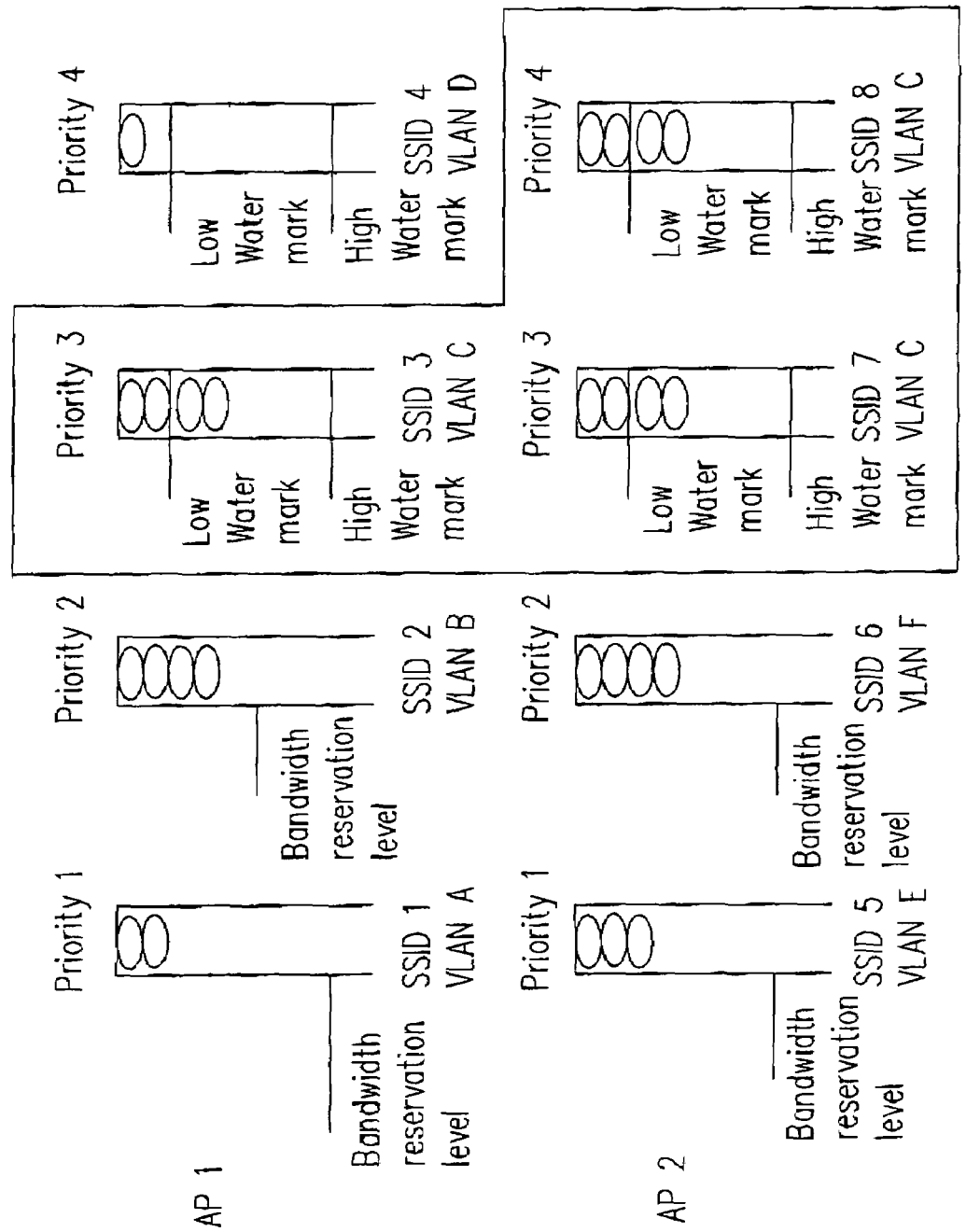

Referring to FIG. 6, CLI of SSID 3 drops to the low water mark while the CLIs of SSIDs 7 and 8 are still above the low water mark. Referring to FIG. 7, the traffics of SSIDs 7 and 8 are shifted to SSID 3 until the CLIs of all three SSIDs accordingly become the same again.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A load balancing method for a wireless local area network (LAN) having a plurality of access points, each of the access points has a plurality of queues, and the load balancing method comprises:

assigning each of the queues to a plurality of corresponding classes of service;

mapping each of the corresponding classes of service to a plurality of virtual local area networks (VLANs);

mapping each of a plurality of identifiers to a VLAN tag corresponding to one of the VLANs;

making a load balancing decision by a load balancing module according to the traffic conditions and bandwidth availability of each of a plurality of traffic priority classes based on a corresponding class of service, and taking the VLANs on a per VLAN tag into consideration when making the load balancing decision by the load balancing module; and performing load balancing by the load balancing module according to the corresponding traffic priority class within the same VLAN.

2. The load balancing method as claimed in claim 1, wherein the load balancing module is a centralized module which the load balancing decision is determined by the centralized module.

3. The load balancing method as claimed in claim 1, wherein the load balancing decision is determined through information exchanges among distributed load balancing modules of the access points.

4. The load balancing method as claimed in claim 1, wherein each of the VLANs is defined with the corresponding traffic priority class.

5. The load balancing method as claimed in claim 4, wherein when the corresponding traffic priority class of the VLAN tag is mapped to a constant-bit-rate traffic type, the load balancing decision being made by the load balancing module of one of the access point comprising:
    reserving and dividing a bandwidth for each of the access points in according to a bit rate to get a number of concurrent connections that are accommodated under reservation; and
    a new constant-bit-rate request being admitted if and only if a quantum of bandwidth equals to the bit-rate is available, and the quantum of bandwidth is assigned to a requesting session.

6. The load balancing method as claimed in claim 1, wherein the plurality of identifiers are a plurality of service set identifiers (SSIDs).

7. The load balancing method as claimed in claim 6, wherein the relationship between SSID and VLAN tag is one-to-one.

8. The load balancing method as claimed in claim 6, wherein the relationship between SSID and VLAN tag is many-to-one.

9. The load balancing method as claimed in claim 6, wherein the load balancing is performed within the same SSID.

10. The load balancing method as claimed in claim 6, wherein the load balancing module performs load balancing in according to the corresponding traffic priority class within the same VLAN and the plurality of SSIDs.

11. The QoS load balancing method as claimed in claim 1, wherein the plurality of identifiers are a plurality of basic service set identifiers (BSSIDs).

12. The load balancing method as claimed in claim 11, wherein the relationship between BSSID and VLAN tag is one-to-one.

13. The load balancing method as claimed in claim 11, wherein the relationship between BSSID and VLAN tag is many-to-one.

14. The load balancing method as claimed in claim 11, wherein the load balancing module performs load balancing in according to the corresponding traffic priority class within the same VLAN and the same BSSID.

15. The load balancing method as claimed in claim 11, wherein the load balancing module performs load balancing in according to the corresponding traffic priority class within the same VLAN and the BSSIDs.

16. The load balancing method as claimed in claim 1, wherein when the corresponding traffic priority class of the VLAN tag is mapped to a variable-bit-rate traffic type, the load balancing decision being made by the load balancing module of one of the access points comprising using a tuple of a congestion level indicator (CLI) to indicate if congestion occurs.

17. The load balancing method as claimed in claim 16, wherein the load balancing decision is made by the load balancing module further comprises revoking reverse roaming to force de-association and sequentially perform re-association of traffics to achieve more optimized traffic distribution.

18. The load balancing method as claimed in claim 16, wherein the tuple has a plurality of attributes to indicate if the congestion occurs.

19. The load balancing method as claimed in claim 18, wherein the attributes of the tuple are a queue length, utilization level or the number of concurrent sessions.

20. The load balancing method as claimed in claim 18, wherein the attributes of the tuple comprises reception of various clients, the reception of the clients comprises a link quality for each of the clients or a signal noise ratio (S/N ratio).

21. The load balancing method as claimed in claim 18, wherein each of the attributes is associated with a set of high and low water marks.

22. The load balancing method as claimed in claim 18, wherein the load balancing decision is made in according to one of the attributes of the tuple independently.

23. The load balancing method as claimed in claim 18, wherein the load balancing decision is made by a policy-based trigger, which is defined based on a first logic expression of a portion or all of the attributes of the tuple.

24. The load balancing method as claimed in claim 23, wherein the first logic expression is a Boolean logic function or an equivalent function, and the inputs of the Boolean logic function or the equivalent function are the attributes of the tuple.

25. The load balancing method as claimed in claim 23, wherein each of the attributes is selectively associated with a set of high or low water marks and the policy-based trigger is defined selectively based on any combination of a second logic expression of the high or low water marks of the attributes of the tuple.

26. The load balancing method as claimed in claim 25, wherein the second logic expression is a Boolean logic function or an equivalent function, and the inputs of the Boolean logic function or the equivalent function are the attributes of the low or high watermarks.

27. The load balancing method as claimed in claim 23, wherein the policy-based trigger is activated when one or a portion of the attributes of the tuple reaches the high water mark.

28. The load balancing method as claimed in claim 23, wherein the policy-based trigger is activated when a portion or all of the attributes of the tuple drop to the low water mark.

29. The load balancing method as claimed in claim 23, wherein each of the high water marks and the low water marks of the attributes of the tuple is assigned its corresponding weight, the policy-based trigger is defined further based one the first logic expression of a portion or all of the weights of the high water marks and the low water marks.

30. The load balancing method as claimed in claim 29, wherein the weights of the high water marks and the low water marks of the attributes of the tuple is determined based on a cost function.

31. The load balancing method as claimed in claim 30, wherein the weights of the high water marks and the low water marks are selectively adaptive.

32. The load balancing method as claimed in claim 31, wherein the weights of the high water marks and the low water marks are selectively adaptive in according to traffic conditions between the APs.

33. The load balancing method as claimed in claim 32, wherein the weights of the high water marks and the low water marks are adaptive in according to conditions defined by network administrators.

34. The load balancing method as claimed in claim 33, wherein the results of the cost functions can be selected in according to an optimal condition set up by the network administrators.

35. The load balancing method as claimed in claim 30, wherein the result of the cost function is a binary decision, which depends on the value of the attribute and the high water mark, or the value of the attribute and the low water mark.

36. The load balancing method as claimed in claim 35, wherein the value of the attribute is higher than the high water mark, the weight corresponding to the attribute is used for the cost function.

37. The load balancing method as claimed in claim 30, wherein the result of the cost function is a quantification decision, which depends on the differences between the value of the attribute and the high water mark in one or more of the attributes of the tuple.

38. The load balancing method as claimed in claim 37, wherein the quantification decision depends on a plurality of normalization values which is achieved by a percentage value obtained by comparing the difference with the value of high water mark.

39. The load balancing method as claimed in claim 37, wherein the quantification decision depends on a plurality of normalization values which is achieved by a percentage value obtained by comparing the difference with a value set by the network administrators.

40. The load balancing method as claimed in claim 30, wherein the result of the cost function is a quantification decision, which depends on the differences between the value of the attribute and the low water mark in one or more of the attributes of the tuple.

41. The load balancing method as claimed in claim 40, wherein the quantification decision depends on a plurality of normalization values which is achieved by a percentage value obtained by comparing the difference with the value of high water mark.

42. The load balancing method as claimed in claim 41, wherein the quantification decision depends on a plurality of normalization values which is achieved by a percentage value obtained by comparing the difference with a value set by the network administrators.

43. The load balancing method as claimed in claim 23, wherein the policy-based trigger is selected from a set of default policies which are predefined in the load balancing module and selected by a network administrator.

44. The load balancing method as claimed in claim 23, wherein the trigger is activated for onset of congestion, the load balance module examines the tuples of the CLIs in all of the overlapping access points with priority levels of the traffic priority classes higher than or equal to the overloaded traffic stream and selects traffic sessions corresponding to the SSIDs or BSSIDs with CLIs based on conditions set by the trigger as targets for shifting the load over.

45. The load balancing method as claimed in claim 44, wherein the traffic sessions corresponding to SSIDs or BSSIDs with CLIs below the high water mark are selected according to the trigger as target for shifting the load over.

46. The load balancing method as claimed in claim 44, wherein the the SSIDs or BSSIDs of the selected traffic sessions are all mapped to the same VLAN.

47. The load balancing method as claimed in claim 44, wherein when the traffic sessions corresponding to the SSIDs or BSSIDs with CLIs based on the conditions set by the trigger as targets for shifting the load over, the load is moved across these selected SSIDs or BSSIDs in all of the overlapping access points and the loads of the SSIDs or BSSIDs within the same VLAN are roughly the same.

48. The load balancing method as claimed in claim 23, wherein when the CLI of one of the SSIDs or BSSIDs in the same VLAN drops below the low watermark, the load balance module moves over the traffics from other SSIDs or BSSIDs in the same VLAN in all of the overlapping access points until the CLIs of the SSIDs or BSSIDs in the same VLAN become roughly the same.

49. The load balancing method as claimed in claim 48, wherein the step of moving over the traffic sessions by the load balance module comprises moving the traffic sessions of the SSIDs or BSSIDs above the low water mark to the SSIDs or BSSIDs with CLIs lower than the low water mark until the CLIs of the SSIDs or BSSIDs in the same VLAN become roughly the same.

50. The load balancing method as claimed in claim 23, wherein to balance the traffic loads, the sessions in sleep modes are selected first for load balancing.

51. The load balancing method as claimed in claim 23, wherein to balance the traffic loads, reverse roaming is applied to activate the variable-bit-rate traffics.

52. The load balancing method as claimed in claim 23, wherein the policy used for the load balancing is independent from the choice of a service policy.

53. The load balancing method as claimed in claim 52, wherein the service policy is First-Come, First-Served (FCFS), a strict priority, or a weighted fair-queuing.

54. A method for load balancing in a wireless local area network (LAN), wherein the wireless LAN has a plurality of access points, each of the access points comprises a Hostapd program executing apparatus and has a plurality of queues, the Hostapd program executing apparatus has a tuple of a congestion level indicator, the tuple has a plurality of attributes, and the method comprises:
    assigning each of the queues to a plurality of corresponding classes of service;
    mapping each of the corresponding classes of service to a plurality of virtual local area networks (VLANs);
    mapping each of a plurality of identifiers to a VLAN tag corresponding to one of the VLANs;
    triggering a policy based on the attributes in the tuple of the congestion level indicator; and
    executing load balancing by the Hostapd program executing apparatus when the policy based on the attributes in the tuple of the congestion level indicator is triggered, wherein the Hostapd program further comprises a load balancing module, and the load balancing is performed by the load balancing module according to a corresponding traffic priority class within a same VLAN.

55. The method for load balancing in a wireless local area network (LAN) of claim 54, wherein the Hostapd program executing apparatus comprises a load balance module for receiving a queue statistic information, wherein the congestion level indicator is updated with a queue length information from the queue statistic information.

56. The method for load balancing in a wireless local area network (LAN) of claim 54, wherein the Hostapd program executing apparatus comprises a bandwidth monitor module, for sampling statistical information of a bandwidth, wherein the congestion level indicator is updated with utilization information from the bandwidth monitor module.

57. The method for load balancing in a wireless local area network (LAN) of claim 54, wherein the congestion level indicator is transmitted to a wireless driver and sets the wireless driver for executing actions based on the updated congestion level indicator.

58. The method for load balancing in a wireless local area network (LAN) of claim 54, wherein the Hostapd program executing apparatus is configured by a configuration system program.

59. The method for load balancing in a wireless local area network (LAN) of claim 54, wherein the Hostapd program executing apparatus is configured by a Hostapd.conf file stored in the configuration system program.

60. The method for load balancing in a wireless local area network (LAN) of claim 59, wherein the Hostapd.conf file is created by the configuration system program.

61. A load balancing wireless local area network (LAN), the wireless LAN comprising:
a plurality of access points, each of the access points comprises a Hostapd program executing apparatus, the Hostapd program further comprises a load balancing module, and the load balancing is performed by the load balancing module according to a corresponding traffic priority class within a same VLAN, each of the access points further has a plurality of queues, each of the queues is assigned to a plurality of corresponding classes of service, each of the corresponding classes of service is mapped to a plurality of virtual local area networks (VLANs), and each of a plurality of identifiers is mapped to a VLAN tag corresponding to one of the VLANs;

wherein the Hostapd program executing apparatus has a tuple of a congestion level indicator, the tuple has a plurality of attributes, and the Hostapd program apparatus executes load balancing by triggering a policy based on the attributes in the tuple of the congestion level indicator.

62. A load balancing wireless local area network (LAN) of claim 61, wherein the Hostapd program executing apparatus comprises a load balance module for receiving a queue statistic information, wherein the congestion level indicator is updated with a queue length information from the queue statistic information.

63. A load balancing wireless local area network (LAN) of claim 61, wherein the Hostapd program executing apparatus comprises a bandwidth monitor module, for sampling statistical information of a bandwidth, wherein the congestion level indicator is updated with utilization information from the bandwidth monitor module.

64. A load balancing wireless local area network (LAN) of claim 61, wherein the congestion level indicator is transmitted to a wireless driver and sets the wireless driver for executing actions based on the updated congestion level indicator.

65. A load balancing wireless local area network (LAN) of claim 61, wherein the Hostapd program executing apparatus is configured by a configuration system program.

66. A load balancing wireless local area network (LAN) of claim 61, wherein the Hostapd program executing apparatus is configured by a Hostapd.conf file stored in the configuration system program.

67. A load balancing wireless local area network (LAN) of claim 61, wherein the Hostapd.conf file is created by the configuration system program.

* * * * *